2,791,669
BRUSH TYPE SOLDERING DEVICE
Peter B. Ferrara, Silver Spring, Md.

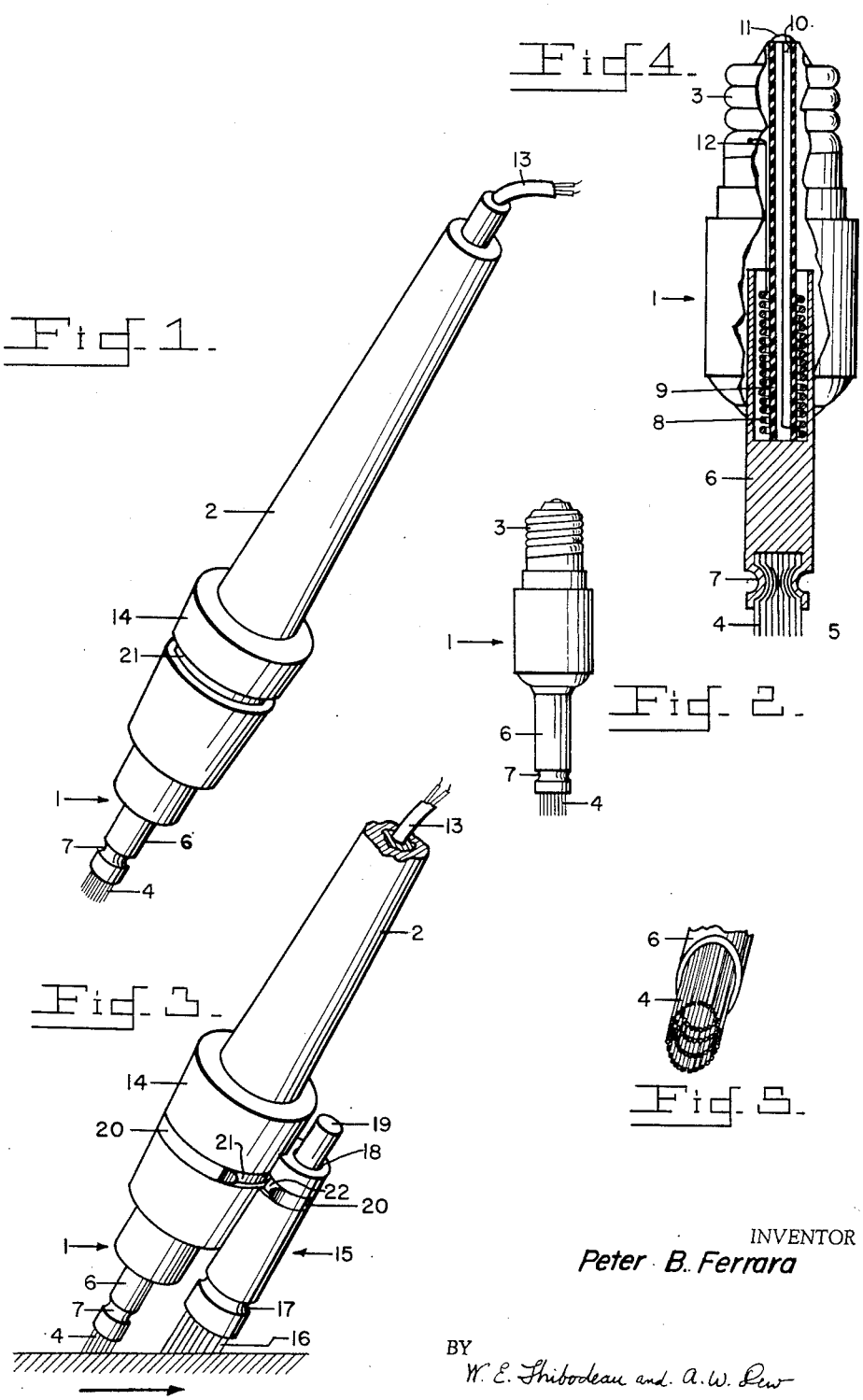
May 7, 1957 — P. B. FERRARA — 2,791,669
BRUSH TYPE SOLDERING DEVICE
Filed Feb. 3, 1955
INVENTOR
Peter B. Ferrara 2,791,669
Patented May 7, 1957

Application February 3, 1955, Serial No. 485,986

12 Claims. (Cl. 219—26)

(Granted under Title 35, U. S. Code (1952), sec. 266)

The invention described herein may be manufactured by or for the Government for governmental purposes without the payment to me of any royalty thereon.

This invention relates to soldering devices and particularly to a brush type soldering device.

There is a need for such a device where it is desired to coat a large area with solder. It has considerable potential, for example, in applying burglar alarm strips to plate glass windows. It would be necessary, of course, to specially treat the area of the glass which is to be coated with the solder.

One object of the invention is a device for applying solder in thin strips.

Another object of the invention is a device for quickly and easily covering large areas with a metallic coating.

Another object of the invention is a brush adapter to replace the solder tip of conventional soldering irons.

Another object of the invention is a replaceable brush insert for conventional soldering irons.

A further object of the invention is an electrically heated metallic bristle brush for applying solder in thin strips.

A still further object of the invention is a soldering brush having flexible metallic bristles.

An additional object of the invention is a combination brush soldering and fluxing device.

One other object of the invention is a brush soldering device which is inexpensive to manufacture.

The specific nature of the invention, as well as other objects and advantages thereof, will clearly appear from the following description and drawings wherein:

Figure 1 is a perspective view of a conventional soldering tip holder having the brush soldering device affixed thereto.

Figure 2 is an elevational view of the invention adapted for employment with a conventional soldering iron holder.

Figure 3 is a perspective view of the invention shown in Fig. 1 with a fluxing device affixed thereto.

Figure 4 is an enlarged view of the device shown in Fig. 2, partly in section, partly cut-away.

Figure 5 is a perspective view of the arrangement of the metallic bristles of the soldering device of Fig. 2.

A preferred embodiment of the invention is a brush type soldering device indicated generally by numeral 1 which is attachable to and removable from a holder 2 by any well known means such as by screw threads 3. The brush portion 4, preferably of small diameter flexible wire bristles, is affixed within recess 5 of stem 6 of assembly 1 by silver soldering or crimping into place. Numeral 7 indicates the crimp used to attach the bristles in the preferred embodiment of the invention. The melting point of the silver solder, if used in lieu of crimping, must be above the maximum operating temperature of the soldering device.

Heat may be applied to this soldering device either internally or externally as in a conventional soldering device. The external method requires that the soldering device have a rather large mass of metal to retain the heat while the device is being employed. In the preferred embodiment of the invention the device 1 is provided with an electrically energized heating coil indicated by numeral 8, Fig. 4, which is wound about a ceramic tube 9. Electrical connection with one end of the coil is made by lead 10 which is positioned within tube 9 and has the other end connected to terminal 11. The opposite end of coil 8 is connected to lead 12 which engages threads 3, said threads acting as the other electrical terminal of the device. The said two terminals make contact with a pair of leads 13 which pass through holder 2. A band 14 of cork or other heat insulating material is positioned upon holder 2 to protect the hands of the operator.

Brush 4, Fig. 5, has a bristle arrangement similar to the arrangement of the bristles in a conventional paint brush wherein the bristles at the outer periphery of the brush are the longest and those in the inner regions become progressively shorter. That configuration permits the brush to contain a working amount of solder and to bend as the solder is applied to the work.

The invention is adapted to combine the brush soldering device with a conventional fluxing device 15. The fluxing device, Fig. 3, has a non-metallic bristle brush 16 maintained in place by crimp 17. The interior of the fluxing device contains a bore, not shown, into which is inserted a wick, not shown. Liquid flux is admitted to the bore through opening 18. The wick is adapted to absorb the flux and feed it, as needed, to the brush 16. Closure member 19 is adapted to be removed from the bore when it is necessary to admit flux.

The fluxing device is adapted to be affixed to and removed from the soldering device by means of a double loop resilient strap 20, the large loop of which is adapted to fit into groove 21 provided in band 14 and the small loop of which is adapted to fit into groove 22 provided in the fluxing device 15.

The pair of leads 13 is connected to an electrical power supply, not shown, and transmits electrical energy through terminals 3 and 11 to the heating coil 8 in device 1. Heat generated within the coil is conducted through stem 6 of device 1 to the brush element 4. It is important that the length of the bristles be controlled inasmuch as bristles which are too short will not bend and those which are too long will not conduct sufficient heat to the bristle tips to perform the soldering function.

To perform the soldering operation the brush is moved along the work as indicated by the arrow in Fig. 3. Wire solder is applied to the brush in a manner similar to the method used to apply solder to a conventional soldering device.

When the fluxing device 15 is used with the brush soldering device the fluxing brush precedes the soldering brush as the combination moves across the work.

It will be apparent that the embodiment shown is only exemplary and that various modifications can be made in construction and arrangement within the scope of the invention as defined in the appended claims.

I claim:

1. A soldering device comprising: a brush having a plurality of metallic bristles; means for supporting the brush, the brush and means for support being in thermal conducting relationship, the bristles being flexible and short enough in length to conduct adequate heat to the remote ends of the bristles; means for transmitting heat to the means for supporting and to the brush; and a fluxing device removably mounted in cooperative relationship with the brush.

2. The device as defined in claim 1 wherein the means for transmitting heat comprises an electrically energized heating element.

3. The device as defined in claim 2 wherein the brush, means for support, and electrical heating element comprise a unit with screw threads on an end opposite the brush adapted to attach the unit to a conventional soldering iron holder.

4. An electrical soldering device comprising: a thermally insulated holder, an electrical heating element attached to said holder, means for connecting said heating element to a source of electrical energy, a brush consisting of parallel flexible metallic wire bristles, said bristles at the outer periphery of said brush are the longest and those in the inner regions become progressively shorter, and means for mechanically and thermally connecting said brush to said heating element; said bristles extending beyond said means for connecting said brush whereby said brush is flexible; said heating element, said bristles, and said means for connecting said brush proportioned so that enough heat is transmitted to the tip of the bristles to melt conventional solder.

5. A soldering device comprising: a brush consisting of parallel flexible metallic wire bristles, a thermally conductive stem attached to the bristles, and a thermally insulated holder attached to the stem, said bristles extending beyond said stem whereby said brush is flexible, yet said bristles being short enough so that sufficient heat is transmitted from the stem to the tip of the bristles to melt conventional solder, the bristles at the outer periphery of said brush being the longest and those in the inner regions becoming progressively shorter.

6. A soldering device comprising in combination: a brush comprised of a plurality of parallel thermally conductive flexible bristles; a thermally conductive stem attached to said bristles; said bristles extending beyond said stem whereby said brush is flexible, yet said bristles being short enough so that sufficient heat may be transmitted from the stem to the tip of the bristles to melt conventional solder; and said bristles at the outer periphery of said brush being the longest and those in the inner regions becoming progressively shorter; and means adjacent said stem for generating heat to heat said stem.

7. An electrical soldering device comprising in combination: a brush consisting of a plurality of parallel thermally conductive bristles, said bristles of said brush are arranged so that a section taken normal to said bristles presents a closed figure with no bristles in the center; a thermally conductive substantially solid stem attached to said bristles; said bristles extending beyond said stem, said bristles being short enough so that sufficient heat may be transmitted from the stem to the tip of the bristles to melt conventional solder; an electrical heating means adjacent said stem for generating heat to heat said stem; and engagement means for connecting said heating means to a source of electrical energy.

8. The invention as defined in claim 7, said bristles at the outer periphery of said brush being the longest and those in the inner regions becoming progressively shorter.

9. The invention as defined in claim 7 wherein said engagement means substantially encloses said heating means and includes screw threads for attachment to a conventional soldering iron holder.

10. The invention as defined in claim 9 wherein said engagement means is affixed to said stem; said stem having an elongated coaxial bore, the major portion of the walls of said bore being enclosed by said engagement means; said heating means being disposed substantially in said bore; said engagement means having electrical terminal means in close proximity to said screw threads; and means electrically connecting said heating means to said terminal means.

11. The invention as defined in claim 7 wherein said bristles are metallic wire; and silver solder, having a melting point above the maximum operating temperature of said soldering device, attaching said stem to said bristles.

12. The invention as defined in claim 7 wherein said bristles are metallic wire; said stem having a bore; said bristles being partially disposed in said bore; and the walls of said bore being crimped to immovably affix said bristles in place within said bore.

References Cited in the file of this patent

UNITED STATES PATENTS

| 399,387 | Dolan | Mar. 12, 1889 |
| 1,238,671 | Holcomb | Aug. 28, 1917 |
| 2,446,236 | Morris | Aug. 3, 1948 |
| 2,539,526 | Sickles | Jan. 30, 1951 |
| 2,552,193 | Lennox | May 8, 1951 |

FOREIGN PATENTS

| 711,330 | Germany | Sept. 30, 1941 |

OTHER REFERENCES

Thomas et al.: "Soldering Aluminum Alloys," Electronics, June 1948, pages 90–92, page 92 relied upon.